United States Patent
Hess et al.

(10) Patent No.: US 11,423,765 B2
(45) Date of Patent: Aug. 23, 2022

(54) PORTABLE ALARM SYSTEM

(71) Applicant: HIPPI, LLC, Clermont, FL (US)

(72) Inventors: Brian K. Hess, Clermont, FL (US); Frank B. Clark, Longview, TX (US)

(73) Assignee: Hippi, LLC, Clermont, FL (US)

( * ) Notice: Subject to any disclaimer, the term of this patent is extended or adjusted under 35 U.S.C. 154(b) by 0 days.

(21) Appl. No.: 16/927,520

(22) Filed: Jul. 13, 2020

(65) Prior Publication Data

US 2020/0342746 A1 Oct. 29, 2020

Related U.S. Application Data

(63) Continuation of application No. 16/228,833, filed on Dec. 21, 2018, now Pat. No. 10,713,931, which is a continuation of application No. 15/654,404, filed on Jul. 19, 2017, now Pat. No. 10,169,981, which is a continuation-in-part of application No. 15/492,675,
(Continued)

(51) Int. Cl.
| | |
|---|---|
| *G08B 25/14* | (2006.01) |
| *G08B 25/01* | (2006.01) |
| *G08B 25/10* | (2006.01) |
| *G08B 25/08* | (2006.01) |
| *G08B 29/04* | (2006.01) |
| *G08B 29/18* | (2006.01) |
| *G08B 13/16* | (2006.01) |

(Continued)

(52) U.S. Cl.
CPC ........... *G08B 25/14* (2013.01); *G08B 25/016* (2013.01); *G08B 25/08* (2013.01); *G08B 25/10* (2013.01); *G08B 29/046* (2013.01); *G08B 29/181* (2013.01); *G08B 13/1672* (2013.01); *G08B 25/014* (2013.01); *G08B 27/003* (2013.01); *G08B 27/006* (2013.01); *H04B 2001/3894* (2013.01)

(58) Field of Classification Search
CPC ............................ G08B 15/001; G08B 25/016
See application file for complete search history.

(56) References Cited

U.S. PATENT DOCUMENTS

| | | | |
|---|---|---|---|
| 2004/0189471 A1* | 9/2004 | Ciarcia, Jr. | ........ G08B 13/2462 340/572.1 |
| 2014/0201315 A1* | 7/2014 | Jacob | .................. H04L 12/2803 709/217 |

(Continued)

*Primary Examiner* — Omeed Alizada
(74) *Attorney, Agent, or Firm* — Harness, Dickey & Pierce PLC

(57) ABSTRACT

A portable alarm system has a base unit including a processor electrically connected to a wireless transceiver configured to communicate wireless signals to an external location. The base unit is further configured to receive wireless alarm signals from at least a first sensor and a second sensor, both of the first and second sensors being physically separated from the base unit. The processor is configured to be selectively programmed by a user to cause the base unit to communicate with a remote monitoring station in response to receiving an alarm signal from the first sensor, but not in response to receiving an alarm signal from the second sensor. Instead, when an alarm signal is received from the second sensor, the processor causes a different action, other than communicating with the monitoring station, to occur. Such action can include, for example, sending a wireless communication to a mobile electronic device.

6 Claims, 3 Drawing Sheets

Related U.S. Application Data filed on Apr. 20, 2017, now abandoned, which is a continuation of application No. 14/711,297, filed on May 13, 2015, now abandoned.

(60) Provisional application No. 61/992,606, filed on May 13, 2014.

(51) Int. Cl.
*G08B 27/00* (2006.01)
*H04B 1/38* (2015.01)

(56) References Cited

U.S. PATENT DOCUMENTS

| | | | |
|---|---|---|---|
| 2016/0005284 A1* | 1/2016 | Batra | G08B 25/10 340/572.1 |
| 2019/0182792 A1* | 6/2019 | Jang | H04W 4/02 |

* cited by examiner

PORTABLE ALARM SYSTEM

CROSS-REFERENCE TO RELATED APPLICATIONS

This application is a continuation of U.S. application Ser. No. 16/228,833 filed 12-21-18, which claims priority to U.S. application Ser. No. 15/654,404 filed 7-19-17, U.S. application Ser. No. 15/492,675 filed 4-20-17, U.S. Application No. 62/403,432 filed 10-3-16, U.S. application Ser. No. 14/711,297 filed 5-13-15 and U.S. Application No. 61/992,606 filed 5-13-14. The entire disclosures of the above applications are incorporated herein by reference.

FIELD

The present disclosure relates to portable alarm systems.

BACKGROUND

Portable alarm systems are now known in the marketplace. Exemplary portable alarm systems are manufactured and sold by Tattletale Portable Alarm Systems, Inc. of Columbus, Ohio. The following United States Patents describe representative portable alarm systems: U.S. Pat. Nos. 5,587,701; 6,049,273; 6,831,557; 5,777,551; and 7,327,220, all of which are incorporated herein by reference. Generally, these portable alarm systems include a portable base unit and at least one remote sensor, which is configured to communicate wirelessly with the portable base unit. The sensor may be conventional wireless window/door sensors, motion sensors, glass breakage sensors and the like. The base unit includes a microprocessor, a receiver configured to receive wireless signals from the wireless sensor 14 and a wireless transceiver configured to communicate over known wireless networks, such as 3G and 4G LTE networks. The portable base unit may also include an integrated motion sensor and a rechargeable battery. In operation, when the sensor detects a trigger event (e.g., window opening, door opening, glass breakage, motion), the wireless sensor emits a wireless signal, which is received by a receiver in the base unit. The receiver converts the wireless signal to an electrical signal, which is communicated to the microprocessor. The microprocessor may then cause the transceiver to initiate a wireless communication to a remote location, e.g., a monitoring station or a designated telephone number, or to initiate other types of communications, such as a text message or alert to a smart phone or other mobile electronic device.

The inventors hereof have developed improvements to the functionality and usefulness of this existing portable alarm system.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings.

Figure 1:
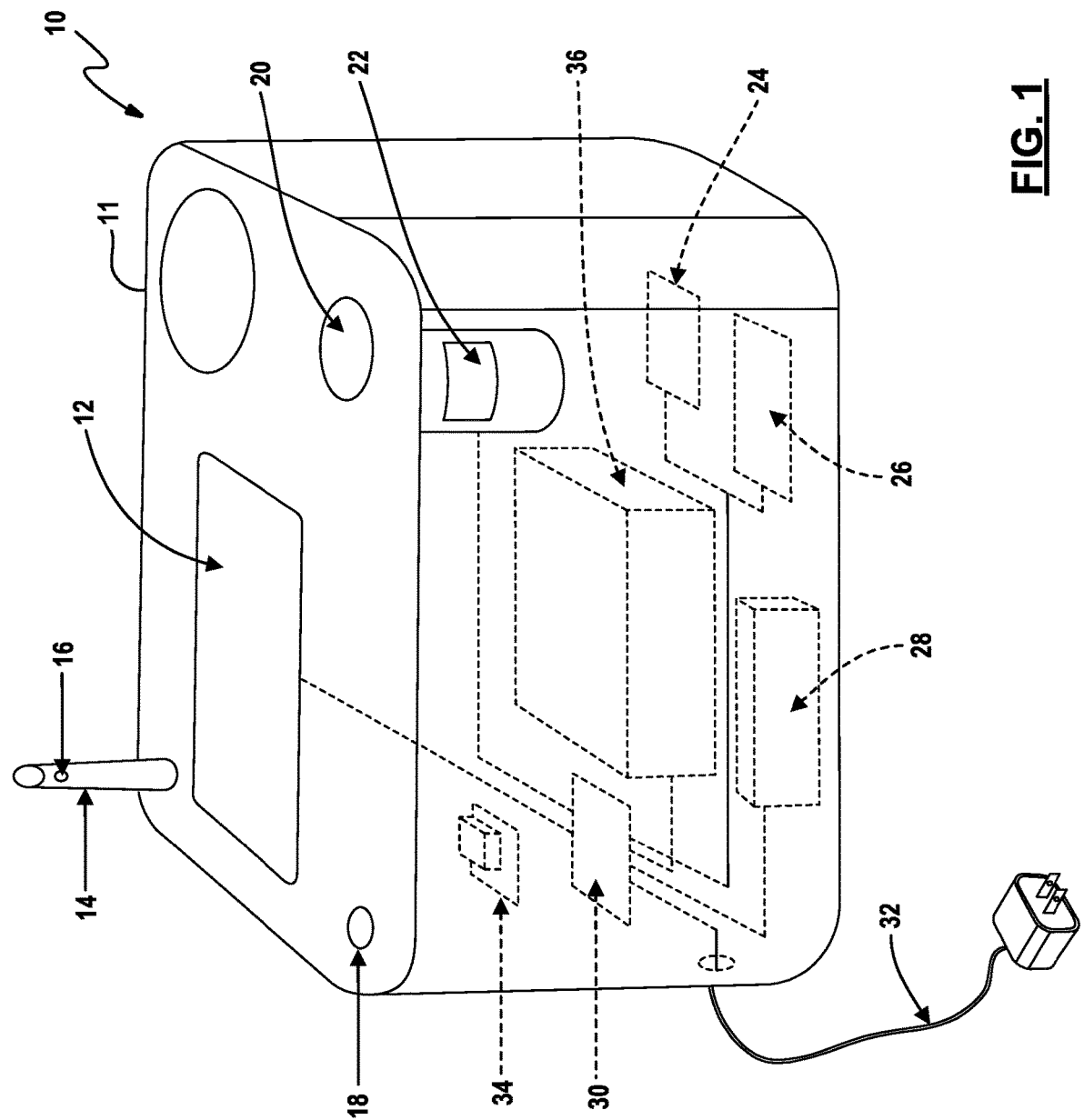
FIG. 1 is a front perspective view of a portable alarm base unit according to an embodiment of the invention, including illustrations of select internal componentry.
Figure 2:
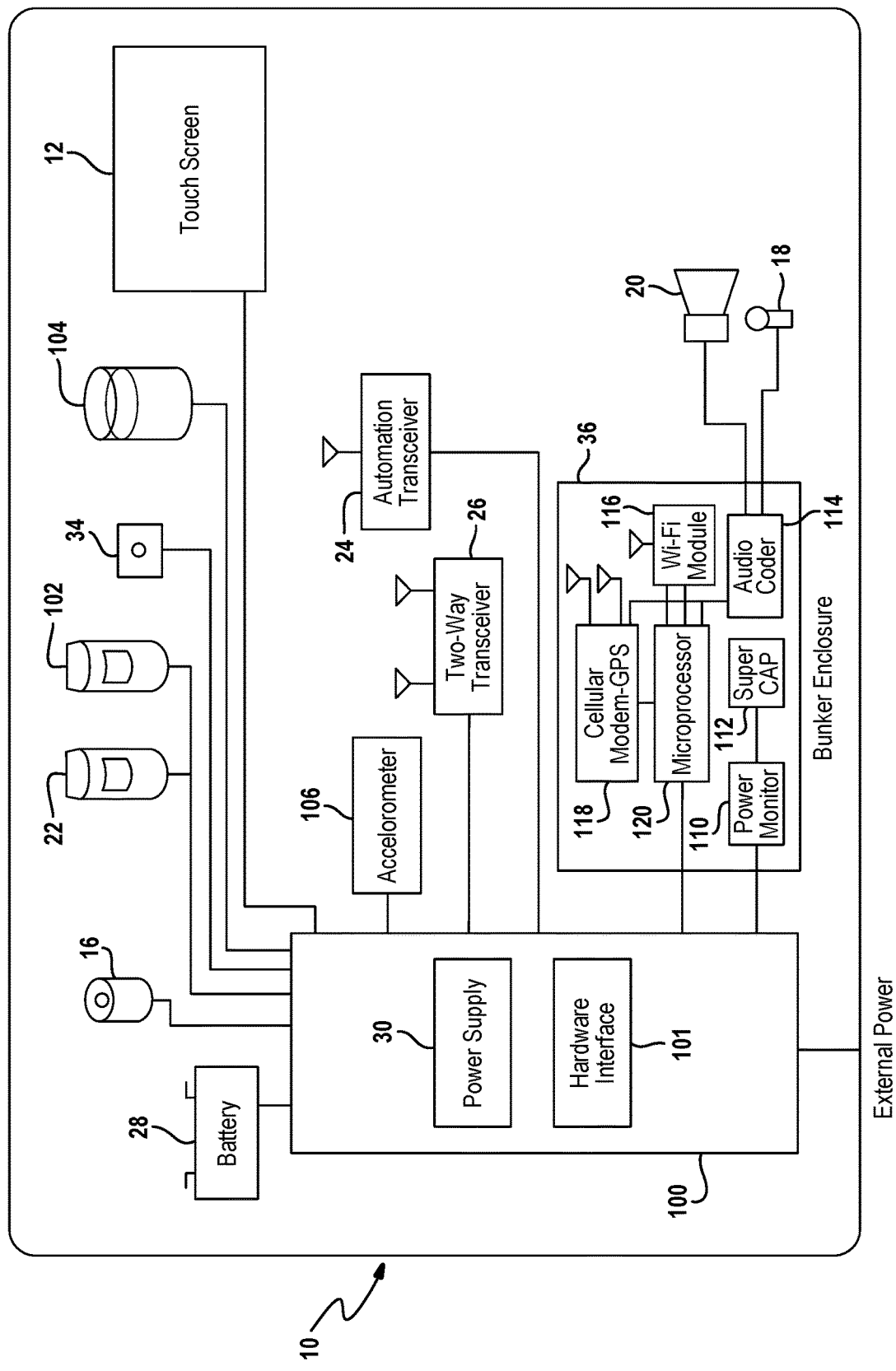
FIG. 2 is a functional diagram of the internal componentry of the exemplary portable alarm base unit illustrated in FIG. 1.

FIG. 1 illustrates a portable alarm base unit 10 from a front perspective view. FIG. 2 is a functional diagram of the portable alarm base unit 10. Components common to both figures maintain the same reference number. With reference to FIGS. 1 and 2, the portable alarm base unit 10 includes a housing 11 that includes various components on the external surface thereof and enclosed thereby that cooperate to operate the portable alarm system. The base unit 10 includes: (i) touch screen display 12, (ii) rotatable camera 16 that may be mounted to an antenna 14, (iii) microphone 18, (iv) speaker 20, (v) strobe light 104, and (vi) front motion sensor 22, all of which are disposed on an outer surface of the housing 11. The base unit 10 further includes a power cord 32 that extends external to the housing 11 to plug into a standard wall power outlet. The base unit 10 may also include a rear motion sensor 102 (not shown in FIG. 1). The following components are incorporated inside of housing 11: (i) a hardware module 100, which includes a power supply 30 and a hardware interface 101, (ii) a Z-wave or other automation transceiver 24, (iii) a two-way wireless transceiver 26, (iv) a backup battery 28, (v) an accelerometer 106, and (v) a pressure sensor 34. The housing 11 also encloses a secondary protective housing 36, which includes therein several operational components that are considered particularly important for communications: (i) cellular modem and GPS unit 118, (ii) Wi-Fi transceiver 116, (iii) power module 110, (iv) power storage device 112, (v) CODEC 114, and (vi) microprocessor 120.

The hardware module 100 supplies power (via power supply 30) and provides a hardware interface 101 to the various components housed in the base unit 10. The hardware module 100 receives power from battery 28 and/or from a standard wall outlet through power cord 32. Hardware module 100 is electrically connected to rotatable camera 16, front and rear motion sensors 22 and 102, pressure sensor 34, strobe light 104, and touchscreen display 12. The hardware module 100 is further electrically connected to accelerometer 106, two-way transceiver 26 and automation transceiver 24. Hardware module 100 is electrically connected to the power module 110 and the microprocessor 120 inside of the secondary protective housing 36. The microprocessor 120 is electrically connected to the Wi-Fi transceiver 116, the CODEC 114 and the cellular modem/GPS module 118.

Figure 3:
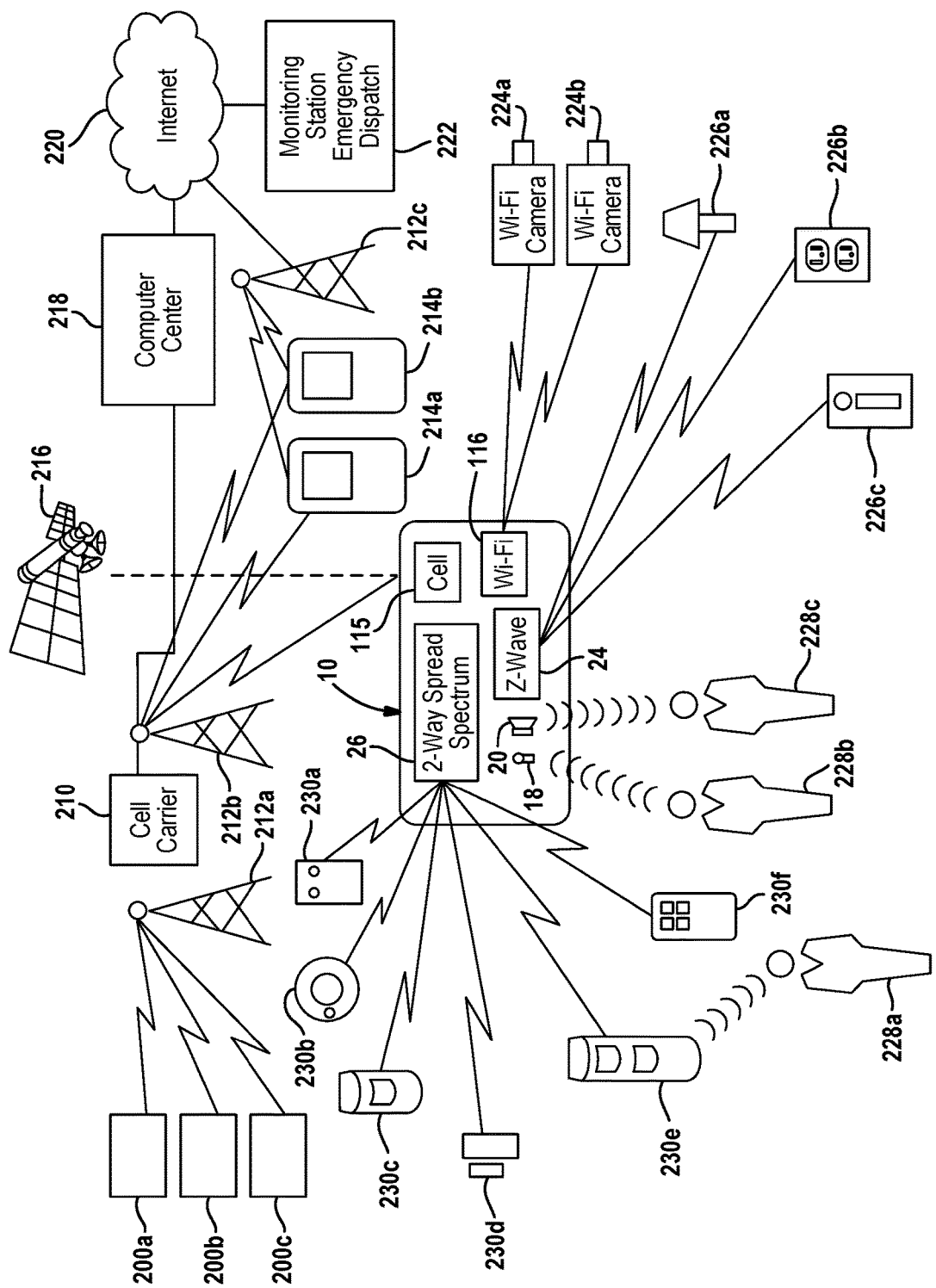
FIG. 3 is an environmental diagram illustrating communications between the portable alarm base unit shown in FIGS. 1 and 2 and various external devices.

FIG. 3 is an environmental illustration showing various communication paths of the base unit 10. The base unit 10 receives inputs from users 228a-c. The inputs can be tactile using the touchscreen display 12 or verbal. The users 228a-228c may also receive auditory alerts from the base unit 10. The base unit 10 further communicates with a variety of wireless sensors 230a-230d and key fobs and remote controls 230e-230f. The wireless sensors 230a-230d provide alarm signals to base unit 10 and key fobs and remote controls 230e-230f provide wireless control signals to base unit 10. Base units 200a-200c communicate wirelessly with cell tower 212a, which is communicatively coupled to cell carrier 210. Cell tower 212b is also communicatively coupled to cell carrier 210 and wirelessly communicates with cell phone devices 214a and 214b. Cell phone devices 214a and 214b can wirelessly communicate with monitoring station 222 and computer center 218 via cell tower 212c and internet 220. Base unit 10 communicates directly with cell phones 214a and 214b via cell tower 212b. Base unit 10 also communicates with computer center 218 via cell tower 212b and cell carrier 210. The computer center 218 communicates with the monitoring station 222 via internet 220. Base unit 10 can also communicate with satellite 216. Base unit 10 can also communicate wirelessly with a variety of sensors and monitoring devices, including Wi-Fi cameras 224a-b and home automation devices 226a-226c.

Anti-Tampering Functionality

With reference to FIGS. 1 and 2, the base unit 10 is configured to overcome attempts by a perpetrator to destroy/disable the base unit 10 which would otherwise prevent it from communicating an alarm signal to either a monitoring station 222 or directly to a user's mobile electronic device, e.g., 214a, 214b. The secondary protective housing 36 in combination with various methods for detecting attempts to destroy and/or disable the base unit 10 accomplish this goal.

Secondary Protective Housing ("Bunker") 36

The housing 11 of base unit 10 is made from molded plastic or a similar material. While durable, the base unit housing 11 is not typically adapted to withstand severe abuse, such as being shot with a gun, smashed with a baseball bat or hammer, or submerged in water. It is conceivable that a perpetrator could cause such severe abuse after triggering a sensor but before the base unit 10 is able to initiate and complete a call to the remote monitoring stations and/or initiate and complete a communication (e.g., text message or alert) to a designated smart phone or other electronic device. It is also possible that a perpetrator could cause such abuse even prior to the base unit 10 being armed. To address this contingency, the secondary protective housing 36 is configured to house the electronic components that are critical to communications and to be generally highly resistant to physical abuse that could be imposed on the portable base unit 10 in the context of the normal usage of the system, such as submersion in water, smashing and/or shooting with a gun. Therefore, the secondary protective housing 36 is preferably made from an extremely strong and durable material, such as polycarbonate, and is preferably sealed and waterproof.

As described above, the secondary protective housing 36 contains therein the components of the base unit 10 that are most critical for communications, including for example: (i) microprocessor 120, (ii) communications component(s), such as Wi-Fi transceiver 116 and/or cellular modem/GPS 118, (iii) CODEC 114, (iv) power module 110, and (v) a power storage device, such as a super capacitor 112. In short, the secondary protective housing 36 should at least include components that are necessary to generate a wireless communication outside of the base unit 10 when an act of abuse is detected that otherwise could incapacitate the communications of the base unit 10.

Power is normally suppled to the components within the housing 11 by the main power supply 30 and monitored by the microprocessor 120 in conjunction with the power module 110. The super capacitor 112 is maintained charged by the main power supply 30 and ready to be used to maintain power to the components inside of the secondary protective housing 36 in the event that an abuse event is detected or power from the main power supply 30 is lost. Super capacitor 112 may be an ultra capacitor (or equivalent) or a combination thereof.

The power storage device, such as super capacitor 112 (or an ultra-capacitor) is configured to store energy sufficient to power the components (e.g., microprocessor 120 and communication component(s)) necessary to generate a communication from the base unit 10 to an external location, such as a monitoring station 222 or a mobile electronic device 214a, 214b. A benefit of implementing the power storage device in the form of a super capacitor or ultra-capacitor is that such devices can be charged to full capacity in a couple of seconds from an external power source and the need to periodically replace back-up batteries is eliminated. However, other mechanisms for storing energy to power components contained in the secondary protective housing 36 for a short period of time consistent with the purposes described herein could be used in place of the super capacitor or ultra-capacitor, such as re-chargeable batteries and the like.

During normal operation, the components within the secondary protective housing 36 will interact with all of those outside of the secondary protective housing 36 as well, including all of the sensors, touchscreen, additional transceivers and power sources, acting as the main control and system master. It is only when the microprocessor 120 has detected all primary power sources have been eliminated will it terminate all communication and further servicing of system components outside of the secondary protective housing 36 and prepare to send a final signal out from the cellular and/or Wi-Fi transceiver with its last GPS coordinates to indicate it has been attacked and is no longer in operation.

Detection of Abuse to, Disablement of and/or Movement of the Base Unit

Detection of abuse to the base unit 10 can be accomplished in many different ways. In one example, accelerometer 106 is used to detect sudden impacts such as those caused by a blow from a hammer, bat, fist, etc. This information is communicated to microprocessor 120 and processed according to known methods. This type of detection can be done through either preprogramming accelerometer 106, through a serial connection with a set of X, Y and Z axis G-Force values and time windows that would constitute an impact level. Once accelerometer 106 detects movement (impact) that would meet or exceed the values and time windows for any of the axes, a separate signal can be passed to the microprocessor 120 via an interrupt pin to indicate an impact has occurred. Alternatively, the accelerometer 106 can be polled by the microprocessor 120 though a serial connection and the raw X, Y and Z axis information retrieved. The microprocessor 120 could then perform a detection algorithm in a similar manner by detecting G-forces in any axis above set thresholds within a given time window.

In a second example, accelerometer 106 is also used to detect movement of the base unit 10 from where it was positioned. It can detect tilting, sliding and dropping, all of which could be considered efforts to reposition the base unit 10 to gain access, relocate or steal the unit in order to prevent proper operation. The accelerometer 106 will be polled by the microprocessor 120 though a serial connection and the raw X, Y and Z axis information retrieved. The microprocessor 120 would then perform a detection algorithm that would compare the received values to the normal values for the base unit 10 sitting stationary on a flat surface to detect a gross change that would indicate movement.

In a third example, removal of the external power can be detected by the microprocessor 120 and considered as an act of a potential attacker to defeat the base unit's ability to sound and transmit an alarm signal. Various electrical and mechanical approaches to determining if a power cord is connected can be applied.

In a fourth example, a pressure transducer 34 is used to detect a sudden change in atmospheric pressure within the outer housing which would indicate a breach of the outer shell through some means such as a drill, punch, gunshot, torch, knife, etc. The microprocessor 120 would continually monitor and adjust for ambient (normal) pressure within the housing 11 in order to detect a small sudden change from normal gradual change due to effects of temperature and outside pressure changes.

In a fifth example, a multilayer metalized membrane may be secured to vulnerable areas on the inside surface of the housing 11. An electrical potential can be applied across the layers of the membrane. When a conductive object (or material) such as a drill bit, knife, water, etc. comes in contact with two different metalized layers of the membrane, an electrical current will flow between those layers and will be detected by the microprocessor 120 as a breach.

In a sixth example, an approach to detecting interference with the touchscreen 12 of the base unit 10 can be employed. Touchscreen 12 is in constant bidirectional communication with the microprocessor 120. Whenever that communication has been interrupted, the microprocessor 120 will attempt to power cycle touchscreen 12 in an attempt to re-establish communication. If that attempt to re-establish communication fails after 3 attempts in a row, the microprocessor 120 can be programmed to generate a signal indicating that the touchscreen 12 has been disabled.

Regardless of the detection approach(es) employed, the microprocessor 120 is configured to receive signals from one or more components of the system that allow the microprocessor 120 to determine if an event that qualifies as an act of abuse or attempt to disable the base unit 10 has occurred. The microprocessor 120 can be configured to detect and react to events that qualify as an act of abuse or attempt to disable the base unit whether the base unit 10 is armed or not armed. That is, the base unit 10 can be configured to "monitor itself" whether the security system is in the "armed" state or the "unarmed" state. When the microprocessor 120 identifies such a condition, the microprocessor 120 initiates at least one wireless transmission to the monitoring station and/or designated mobile electronic device with an alert of the condition. Additionally, the GPS unit may be activated and communication between the GPS unit of the base unit 10 and either or both of a mobile electronic device and/or the monitoring station 222 can be established, allowing a user to track the location of the base unit 10 in the event that it is moved without authorization. Secondary protective housing 36 ensures that the microprocessor 120, communications devices, and other components maintained within the secondary protective housing 36 remain functional even if the rest of the base unit 10 has been compromised, and the super capacitor 112 (or other energy storage device) ensures that such components have sufficient power for at least one final wireless transmission.

This described use of secondary protective housing 36 to protect the microprocessor 120 and the cellular modem/GPS 118 from many types of abuse, along with the inclusion of super capacitor 112 (or other energy storage device), provides the base unit 10 with the ability to communicate with the monitoring station 222 and/or a designated portable electronic device, e.g., 214a-214b, for a short period of time after the base unit 10 itself has been subjected to severe abuse or water damage. Upon detection of a qualifying act, such as severe abuse, submersion in water or disconnection of power, a communication is sent from the components inside of the secondary protective housing 36 to an external location indicating that the base unit 10 has been attacked.

Surround Motion Sensing

The base unit 10 includes a motion sensor 22 on the front of housing 11 and also a motion sensor 102 on the rear of the base unit 10. Additionally, it may be desirable to include motion sensors on the sides of the base unit 10. In this manner, the base unit 10 is protected from attack from all directions and is able to trigger an alarm and wireless transmission in response to movement in any direction of the base unit 10.

Integrated Hot Spot

It is becoming more common to add wireless broadband cameras to a protected premise to raise the level of security and available information to the user and monitoring center. There are five main problems with the typical installation of such cameras, as set forth below.

First, most broadband connections that serve security devices within a premise (for the actual security system and auxiliary devices such as cameras) are powered by mains power (from a utility company) and are subject to failure during storms, accidents and overloads. Even if the security system has a backup power source, the ability to send out signals using the broadband connection would be compromised when the mains power is lost.

Second, in a typical premise, all broadband connections are provided through some hardwired connection into the building such as cable service, DSL, fiber optic, satellite antenna, etc. As such, these connections are vulnerable to attack by any potential intruder by simply cutting the wires for the broadband service from outside the protected premise.

Third, the cameras are sharing the network with all of the other computers, tablets, gaming systems, etc. normally used within and surrounding the premise and as such are can be limited in bandwidth due to the other devices streaming needs.

Fourth, most Wi-Fi networks employ some sort of data security through the use of system IDs and passwords, which provide some degree of cyber security when and if they are used. However, because these systems are mostly 'open' in nature—since the system ID and password are set up by the system owner or IT personnel—the network can still be joined by anyone that knows the password.

Finally, most broadband network equipment is not monitored by external devices for normal operation and can occasionally lock up, under which conditions they can no longer exchange data with the wide area network (e.g., Internet) or other devices within the local network, until someone can reset them manually.

An embodiment of the portable alarm system described herein addresses some or all of these particular problems. The portable alarm system may incorporate a 3G or 4G LTE or equivalent type wireless transceiver in the base unit 10, which is configured to establish the base unit 10 as a cellular hot spot that can only be accessed by the cameras (or other remote sensing devices) used in the portable alarm system. The wireless cameras would also include a 3G or 4G LTE transmitter. Because the base unit 10 includes a rechargeable battery 28 for powering the base unit 10 during times of power outage or as simply an alternative source of power when stationary power is not readily available, the private 3G or 4G LTE is not entirely dependent on the stationary power of the monitored premises. Therefore, the 3G or 4G LTE private network can be used as an alternative mechanism for cameras to communicate captured video data to the base unit 10. Once the video data is received by the base unit 10, the base unit 10 may transmit the video data to a remote electronic device in a manner typically used. In this way, a power outage in the premises does not affect the ability for the designated remote electronic device to receive the captured video data, so long as the battery in the base unit 10 has sufficient charge.

In more detail, a private Wi-Fi hotspot system is integrated within the base unit 10 and secondary protective enclosure 36. The primary components that make up the hotspot are the primary power sources 32, 30, 110, backup power sources 28, 30, microprocessor 120, Wi-Fi module 116 and cellular modem/GPS 118, and associated antennae. Since all of the above subsystems have a backup power source, namely, battery 28, the hotspot will still remain operational even when the mains power has failed.

Microprocessor 120 functions as a pathway, administrator and monitor for the Wi-Fi module 116 and the cellular modem/GPS 118. As a monitor, it will detect any failure in the cellular network and restart the module if required to regain service, including removing the module power and restoring it. As a monitor it will be able to detect any lockup problem on the Wi-Fi network and restart that module if required to re-establish the local network, including removing the module power and restoring it.

Because all established connections from the cellular data network to local Wi-Fi are contained within the base unit 10, there are no wires of any kind exposed that can be cut to disrupt the broadband service of the local Wi-Fi network.

The hot spot system employs a WPS (Wi-Fi protected setup) feature which allows only cameras (or other Wi-Fi devices), authorized by the manufacturer to connect to the local network, thus preventing other devices not associated with the security system or potential attacker's equipment from joining the network. The network ID is not broadcast. The microprocessor 120 and Wi-Fi module 116 will operate in conjunction with the user interface touchscreen 12 during setup and will present a password protected screen to the user/installer to pair new Wi-Fi cameras (or other devices) to the local Wi-Fi network when a button on the camera or device is pressed at the same time. Since no network ID or password is exposed during this process, there is nothing for a potential attacker to use to join the system.

The base unit 10 and the wireless cameras 224a-224b connect to and communicate over the Wi-Fi network in the premises. The base unit 10 then commonly transmits the captured video data to a remote electronic device, such as a mobile electronic device (e.g., smartphone) or a computer.

Inter-Base Unit Communications

Touch screen display 12 is configured to receive input and to display information. Currently, textual information relating to the portable alarm system can be displayed on the touch screen, such as information relating to triggering of one or more of the sensors, system status, textual communications from a monitoring station, etc. However, the inventors hereof have determined that it would be desirable and useful for a plurality of base units 10 and 200a-200b to be able to communicate amongst themselves textual messages via a 3G or 4G LTE wireless network. Accordingly, a user of a first base unit 10 could input (via the touchscreen or other input mechanism) a textual message, which could them be broadcast and transmitted to a plurality of other identified base units. This mechanism would be useful in a variety of instances, including, for example, for communicating within a neighborhood information that is relevant to the neighborhood concerning safety, such as the identification of suspicious activity in the neighborhood. Further, this mechanism could be used to broadcast a message to a large group of users of base units 10 and 200a-200b, such as in the context of a university or other defined community, such as the broadcast required under the Cleary Act in Florida requiring universities to broadcast campus-wide certain safety-related information.

More specifically, all base units (10, 200a, 200b ...) contain a number of components within them that would allow for a user to interact with it in a number of ways, visually (e.g., touchscreen, LED's, strobe light), audibly (speaker, siren, microphone), remotely (Wi-Fi, cellular). As such, it allows the unit to be utilized in a non-traditional manner where information can be exchanged between base units and/or a computer center and/or user mobile electronic devices. There are three general categories of how the non-traditional communication would take place and how each would have its own unique set of benefits.

Buddy System:

A first embodiment is referred to as a "buddy system." When configured in this manner, each base unit 10 is able to send signals to other base units (200a, 200b ...) that have been setup as "buddies." When an alarm occurs on a base unit 10 (through any normal means), a signal is sent out through the cellular network 210, 212b, using the cellular modem 118 to the computer center 218. Once the signal reaches the computer center 218, it is forwarded out to mobile electronic devices (smartphones), email addresses and central monitoring stations as normal, but in addition, all additional base units 200a, 200b, etc. that were set up by the user as "buddies" will be sent a special signal from computer center 218, back through the cellular network and passed on to the microprocessor 120 through the cellular modem/GPS 118. Once the microprocessor 120 has decoded the signal as a "buddy alert," a unique sound will be played through the speaker 20, e.g. a siren. Additionally, the microprocessor 120 will instruct the touchscreen 12 to display a message indicating the type of alarm, plus the name, address and telephone number of the buddy system that generated the alarm. The message will remain on the screen until that base unit's user has acknowledged the signal by pressing an icon on the touchscreen 12.

Neighborhood Share:

In a second embodiment, the base units are set up in a "neighborhood share" mode. Since all base units are equipped with GPS location information, separate base units could be considered "neighbors" based on their geographic locations, and, as such, be setup to share information between them that would increase security and community awareness.

When a user 228a-228c has some information to share with their neighbors such as a crime that was just observed, some suspicious person, vehicle or activity was seen, they can initiate a "neighborhood share" signal directly on their base unit 10.

The user would use the touchscreen 12 to navigate to the neighborhood share menu. They would then select to either type in a text message directly on the touchscreen 12 using an alphanumeric keypad or record a short audio message. If the user elects to record a short audio message, they will be prompted to press an icon while speaking the message they want to share with other neighbors. The microphone 18 will assist the audio signal into the CODEC 114, where it will be converted into a digital format and stored in memory.

When the user is satisfied with the message (either text or audio), he/she can press another icon on the touchscreen 12 and a signal will be sent out through the cellular network 210, 212b, using the cellular modem/GPS 118 carrying the message in a digital format to the computer center 218. Once the signal reaches the computer center 218, it is forwarded out to all additional base units 200a, 200b, etc. that have a GPS location within a defined radius of the base unit that initiated the neighborhood share signal from computer center, back through the cellular network and passed on to the microprocessor 120 through the cellular modem/GPS 118. Once the microprocessor 120 has decoded the signal as a neighborhood share, a unique sound will be played through the speaker/siren 20. Additionally, the microprocessor 120 will instruct the touchscreen 12 to display a message indicating a neighborhood share message was received and if ready for the user to display or playback (if an audio recording) through the microprocessor 120 and CODEC 114 and speaker 20.

Emergency Broadcast:

A third embodiment is referred to as an "emergency broadcast." Since all base units are equipped with GPS location information, a signal can be sent to them as a geographic group or as a group based on some other commonality such as community, campus, building, etc. that is initiated from a special signal that is sent to the computer center in the event of some type of emergency situation, such as a natural disaster like a tornado, tsunami, etc. or other threats such as an active shooter situation.

A special web access, that is user ID and Password protected, would be used by an emergency manager to access the computer center 218 and identify the group of base units that will receive emergency broadcast message. The emergency manager will create the actual emergency broadcast message using a template such that the message will be displayed properly on all base units. Once the message is entered, the emergency manager must press an acknowledgement icon on the webpage.

An emergency broadcast signal will be sent from computer center, back through the cellular network and passed on to the microprocessor 120 through the cellular modem/GPS 118 on all base units identified in the emergency manager's group. Once the microprocessor 120 has decoded the signal as an emergency broadcast, a standard emergency alert sound will be played through the Speaker/Siren 20. Additionally, the microprocessor will instruct the touchscreen 12 to display the received emergency broadcast message prominently.

The user at each base unit 10 must acknowledge the emergency broadcast message by pressing an Icon on the touchscreen 12 before any other task is performed on the base unit (with the exception of silencing an active alarm).

Once the user presses the acknowledgement icon, the base unit 10 will create an internal log entry noting the date and time.

The emergency manager can use the same web access to cancel any previous emergency broadcast message. By doing so, a signal will be sent from the computer center, back through the cellular network and passed on to the microprocessor 120 through the cellular modem 118 on all base units identified in the emergency manager's group. Once the microprocessor 120 has decoded the signal as a cancellation signal, it will return to normal operation and remove the emergency broadcast message from the touchscreen 12.

On Demand and Selective Monitoring

In a portable alarm system, there are two main costs associated with the base unit 10 on a month-to-month basis that are passed along to the user: (i) fixed monthly fees associated with having access to cellular network data usage charges; and (ii) fees paid to the monitoring station 222 to professionally monitor the security system and contact local emergency agencies in response to received alarm notifications. These costs can be minimized using on-demand monitoring and selective transmission of alarm signal techniques, as described herein.

Generally, on-demand monitoring refers to a method of controlling the base unit 10 such that it has access to and communicates with the cellular service provider only when the base unit 10 deems it necessary, as configured by the user. That is, instead of paying a monthly fee for monitoring the security system and base unit 10 (or just paying a minimal fixed monthly fee), the base unit 10 and cellular service provider work together in a manner such that the base unit 10 only accesses cellular service upon initiation of the transmission of an alarm signal. Accordingly, the user is not charged a fixed fee for monthly monitoring of the security system, but, instead, is charged on a per-use basis for access to the cellular network. Further, the monitoring station 222 charges the user a fee on a per-use basis as well, instead of a flat monthly fee for monitoring. On-demand monitoring can be implemented on its own, but it works particularly well when combined with selective monitoring, which refers to configuring the base unit 10 such that a communication to the monitoring station 222 is only initiated in response to a signal from certain designated sensors on the system that are so identified and configured by the user during set up (or later).

On-demand and selective monitoring will now be described in more detail. Because the base unit 10 can be configured to use the premise Wi-Fi service, the user can opt to not activate the cellular service initially. Further, since the base unit can be configured to use the user's email service, alarm signals can be sent to family and friends as emails and even use email to text services (which all cellular service providers provide) to send those alarms as SMS/Text messages.

When the user configures the security system and adds sensors and panic buttons to the configuration, he/she can designate certain sensors as "high priority." A "high priority" sensor is one that results in the base unit 10 contacting the monitoring station 222 when the "high priority" sensor is triggered (in addition to sending an email or text message). The base unit 10 will not necessarily contact the monitoring station 222 when non-"high priority" sensors are triggered. As a result, the user incurs a charge from the cellular service provider and from the monitoring station 222 each time a communication is sent to the monitoring station 222, as opposed to a fixed monthly charge from both (though it is still possible and within the scope of the invention if the user continues to pay a nominal monthly fixed fee for cellular service and monitoring).

If the user chooses and agrees during the setup of the base unit 10 the ability to activate the cellular modem at the time of a high priority alarm, or when the premise Wi-Fi has failed, this configuration will be in place and stored within the base unit's memory and with the cellular service provider.

When a user initially applies power to the base unit 10, one of the first messages the user will see on the touchscreen 12 queries the user about the type of service he/she wishes to have. Several options will be presented including on-demand monitoring.

If On-Demand Monitoring is selected one of the following must be completed:

(1) The user will then be prompted for payment information, location, emergency contacts, and all other required information by the Central Monitoring Station. Once that information has been entered and electronically agreed upon, it will be sent electronically to the computer center 218. Once verified, the information will be forwarded on to the central monitoring station 222 and the customer service department. Additionally, the computer center 218 will send a special signal to the base unit 10 indicating that on-demand monitoring is now enabled.

(2) The user can go to a website that is hosted at the computer center 218 using any device they choose, enter the serial number the base unit and fill in the online on-demand monitoring form. Upon completion and electronically agreed upon, the information will be verified and then sent to the central monitoring station 222 and the customer service department. Additionally, the computer center 218 will send a special signal to the base unit 10 indicating that on-demand monitoring is now enabled.

(3) The user can fill out and sign the included on-demand monitoring form (which is prepopulated with the base unit (10) serial number) and either fax or email it to the customer service department. The customer service department will then transfer that information to the online on-demand monitoring form that is hosted at the computer center 218. Once the information is verified, it will be sent to the central monitoring station 222. Additionally, the computer center 218 will send a special signal to the base unit 10 indicating that on-demand monitoring is now enabled.

As the user continues to set up the system by enrolling devices such as sensors/panic buttons 230a-230b and key fobs 230f, one of the prompts on the touchscreen 12 will ask if the added device is considered high priority. If the user initiates the added device is high priority by pressing the corresponding icon, that option will be recorded in non-volatile memory within the base unit 120.

When an alarm is triggered from one of the enrolled devices such as sensors/panic buttons 230a-230b and key fobs 230f a signal will be prepared to be sent out to the normal contact list. If the device's non-volatile stored information indicates it is a high priority and the base unit also has on-demand monitoring enabled, then an additional signal (or additional indicators within the same signal) will be sent from the base unit to the computer center 218. The computer center 218 will forward the alarm information to the central monitoring station 222, which in turn will use the previously sent emergency contact information to notify the proper people and agencies of the alarm. The computer center 218 will also send a message to the customer service department where a charge for the service will be generated.

During normal operation of the base unit, when an alarm is triggered from one of the enrolled devices such as sensors/panic buttons 230a-230b and Key fobs 230f a signal will be prepared to be sent out to the normal contact list. If the signal is not acknowledged by the email servers or the network is not present after a set number of attempts (e.g., 4) AND the device's non-volatile stored information indicates it is a high priority AND the base unit also has on-demand Cellular enabled, then the base unit 10 CPU 120 will apply power to the cellular modem 118 and start the activation process with the cellular carrier 210.

Once cellular service has been established, the base unit 10 will send a signal through the cellular modem 118 to the computer center 218 indicating the cell modem has been activated. The computer center 218 will then send a message to the customer service department where a charge for the cellular activation and service will be generated. Any active devices that currently are in an alarm state and have been previously identified as high priority will generate signals that will be sent to the computer center 218 using the newly activate cellular modem 118 and service.

All Alarm signals received at the computer center 218 will be forwarded out as emails, text messages and if so programmed and enabled, to the central monitoring station 222. This can occur in a "tiered" approach, for example, as follows. An exemplary installed alarm system may be configured with outdoor motion sensors, window, door and glass breakage sensors, and indoor motion sensors. If an outdoor motion sensor is triggered, the base unit may be configured to send a text alert directly to an electronic device (e.g., smart phone) without going through the monitoring station and/or to activate outdoor flood lights. If then a door, window or glass breakage sensor is triggered, the base unit 10 may be configured to sound an audible alarm within the premises and to send an additional alert to the designated remote electronic device. If then an interior motion detector is triggered, e.g., one that is configured as a "high priority" sensor, the base unit 10 may communicate to the monitoring station, which, in turn, may communicate with a local police department and send out law enforcement to the premises. This tiered approach to configuring the responsive activities to take in response to different sensors being triggered improves accuracy of communications to the monitoring station and limits those communications to instances that are most likely to require law enforcement intervention.

Dual Communication Sensors

The wireless sensors that are used with the alarm system commonly are "one directional" in the sense that they, when triggered, communicate a wireless alarm signal back to the base unit 10, which acts upon the signal in a particular manner, e.g., sound audible alarm, call monitoring station, etc. The inventor has invented wireless sensors that include dual "two way" communication with the base unit 10. Specifically, in addition to communicating the traditional alarm signal from the sensor to the base unit 10, the dual communication sensors are configured to receive data from the base unit 10 as well. This dual communication capability enables the sensors to receive audible data, for example. This capability can be useful for a user of the alarm system to be able to communicate to persons through the sensor. For example, if a perpetrator triggers an outdoor motion sensor, the base unit 10 may communicate to the sensor to provide an audible alert and/or audible voice communication, such as "Trespasser—Please leave premises." The particular audible information to communicate can be adjusted, and, the base unit 10 may receive the audible information in real time from an occupant of the premises, who speaks the information into the base unit 10. In any event, the base unit communicates to the sensor, which converts the audible data to an audible sound and projects it through a built-in speaker in the sensor. Other uses for the two-way dual communication between the base unit 10 and the sensors are possible.

Voice Recognition

The inventor hereof has invented a base unit 10 and/or remote wireless sensors that are capable to detecting audible voice triggers. That is, a base unit 10 and/or remote sensors 230a-230d can be equipped with microphones configured to receive audible information, to convert such audible information to digital data and to assess the digital data to determine if the audible information matches a particular profile that would be sufficient to trigger an alarm. For example, the base unit 10 and/or sensors could be configured to recognize certain words, such as "Help", or "Get Out", etc., particularly when spoken in high pitches, loud volumes, in repeated fashion or certain combinations. When such audible triggers are detected and deciphered, the base unit 10 can treat it an alarm trigger and take action in any number of configured ways, e.g., sound audible alarm, call monitoring station, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable alarm system, comprising:
    a base unit including a processor electrically connected to a wireless transceiver configured to communicate wireless signals to an external location, wherein the base unit is further configured to receive wireless alarm signals from a plurality of sensors, including at least a first sensor that is physically separated from the base unit;
    wherein the processor is configured to be selectively programmed by a user of the portable alarm system to generate a communication to be sent via a non-cellular network in response to the base unit receiving an alarm signal from the first sensor;
    wherein the processor is configured to be selectively programmed by the user of the portable alarm system to cause a cellular modem to be activated from an otherwise inactive state and for the base unit to send the communication via the cellular network if both of the following conditions are met: (i) the communication has not reached the intended recipient via the non-cellular network, and (ii) the first sensor has been pre-approved by the user from among the plurality of sensors as eligible to cause activation of the cellular modem.

2. The portable alarm system of claim 1, wherein the communication is sent by email.

3. The portable alarm system of claim 1, wherein the communication is sent to a mobile electronic device.

4. The portable alarm system of claim 1, wherein the communication is sent by SMS/text message.

5. The portable alarm system of claim 1, wherein the communication not reaching the intended recipient via the non-cellular network is due to the base unit not being able to access a non-cellular network.

6. The portable alarm system of claim 1, wherein causing the cellular modem to be activated from an otherwise inactive state comprises applying power to the cellular modem, which previously was substantially unpowered.

* * * * *